Oct. 13, 1964  J. R. HORTON ETAL  3,152,942
STITCHING HEAD ASSEMBLY FOR REPAIRING TIRES
Filed Feb. 8, 1962  2 Sheets-Sheet 1
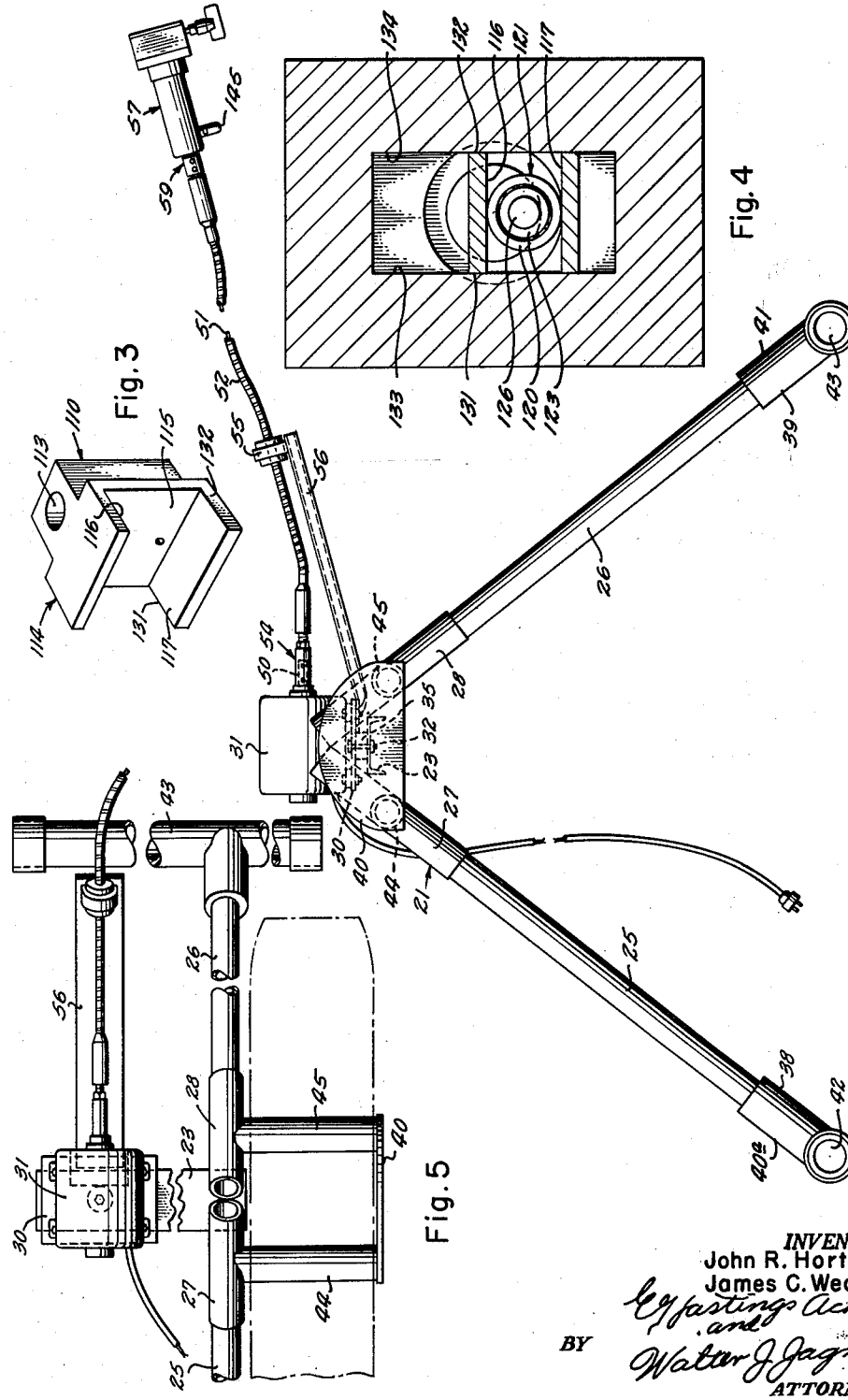
INVENTOR.
John R. Horton
James C. Weaver
BY
ATTORNEYS

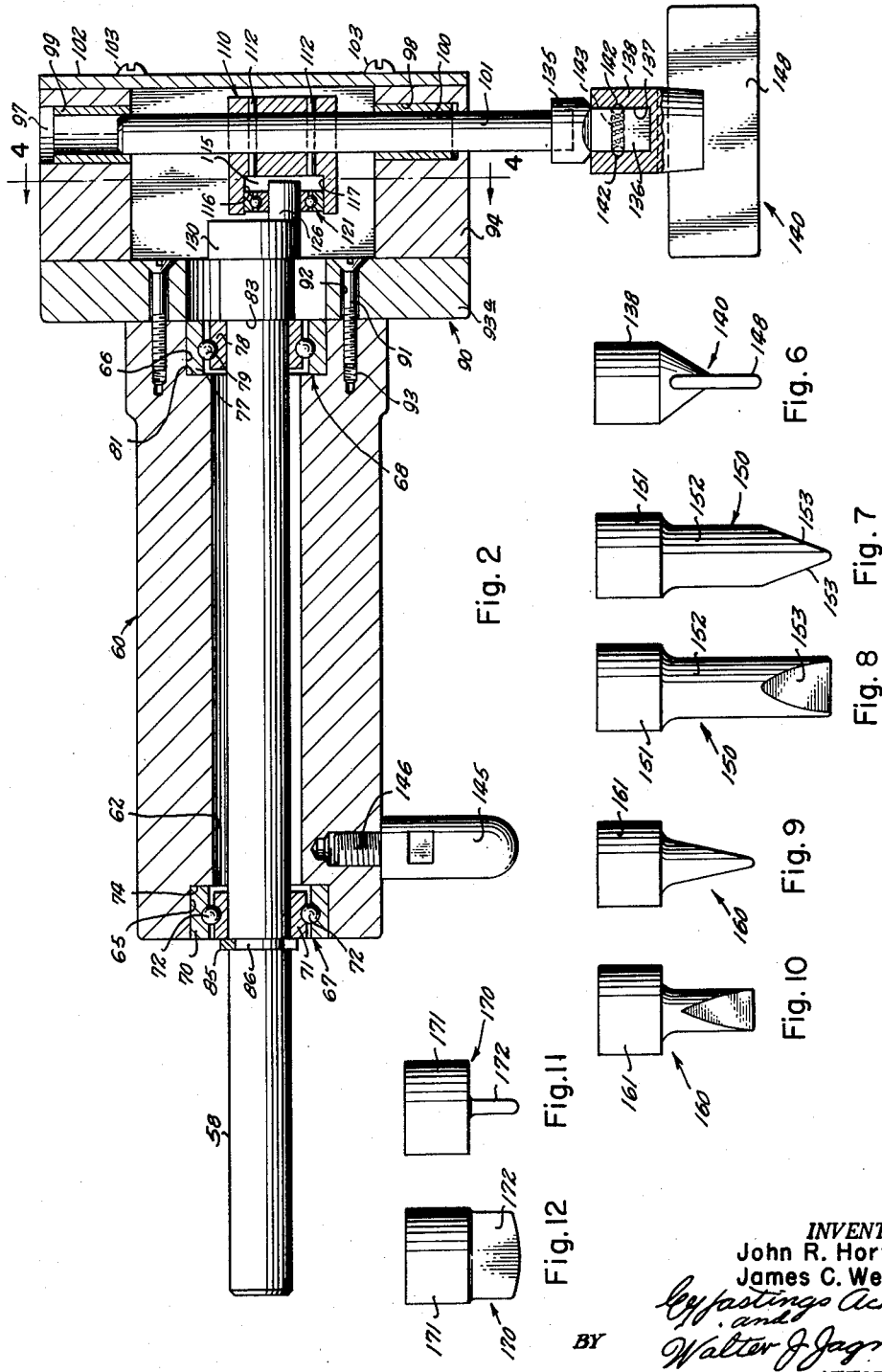

United States Patent Office 3,152,942
Patented Oct. 13, 1964

3,152,942
STITCHING HEAD ASSEMBLY FOR REPAIRING TIRES
John R. Horton, Rte. 1, Box 192D, Grand Prairie, Tex., and James C. Weaver, 1608 Bradford St., Irving, Tex.
Filed Feb. 8, 1962, Ser. No. 171,950
9 Claims. (Cl. 156—421)

This invention relates to tire repair apparatus and more particularly to a rubber stitcher for use in stitching or adhering gummed rubber to tire carcasses.

An object of this invention is to provide a new and improved device for placing new gum rubber in depressions or indentations of a tire.

Another object is to provide a new and improved rubber stitcher for placing new gum rubber in depressions or indentations in a rubber coated fabric carcass of the tire before a recapping strip is applied to the carcass.

Still another object is to provide a new and improved rubber stitcher for building up a tire carcass with a plug of solid gum rubber before a recapping strip is applied to the carcass.

A further object is to provide a new and improved rubber stitcher for imparing repeated impacts to the gum rubber applied to a tire carcass in order to remove any air which might be trapped between the gum rubber and the carcass and to force the gum rubber into close adhering contact with the tire carcass.

A still further object is to provide a rubber stitcher having a stitching head assembly provided with a reciprocating member for imparting reciprocatory motion to a working blade which is placed in contact with the gum rubber in order to impart impacts to the gum rubber.

Another object is to provide stitcher head assembly which converts the rotary motion of a drive shaft to vibratory motion of a vibrator shaft provided with a rubber working tool or blade.

Still another object is to provide a new and improved rubber stitcher which includes a support on which a prime mover, such as an electric motor, and a tire holding mandrel may be mounted and having a stitcher head assembly driven from the power shaft of the prime mover by a suitable flexible drive shaft so that the stitcher head assembly may be easily manipulated to cause its rubber working tool or blade to impart impacts to the gum rubber applied to the tire carcass carried by the mandrel of the support.

A further object of the invention is to provide a stitcher assembly wherein a stitcher head is provided with a support engageable with the tire carcass whereby the operator need not support the full weight and absorb any shocks vibration of the stitcher assembly.

A still further object is to provide a rubber stitcher of the type described whereby in prime mover is rotatably or pivotally mounted whereby use of the head stitcher assembly is facilitated.

Additional objects and advantages of the invention will be readily apparent from the reading of the following description of a device constructed in accordance with the invention, and reference to the accompanying drawings thereof, wherein:

FIGURE 1 is a side view of the rubber stitcher embodying the invention;

FIGURE 2 is a longitudinal sectional view of the stitcher head assembly of the rubber stitcher;

FIGURE 3 is a perspective view of a vibrator block of the stitcher head assembly;

FIGURE 4 is a sectional view taken on line 4—4 of FIGURE 2;

FIGURE 5 is a fragmentary top view of the rubber stitcher illustrated in FIGURE 1;

FIGURE 6 is an end view of the rubber working tool or blade of the stitching head assembly illustrated in FIGURE 2;

FIGURE 7 is an end view of a modified form of the rubber working tool;

FIGURE 8 is a side view of the rubber working tool illustrated in FIGURE 7;

FIGURE 9 is an end view of another rubber working tool;

FIGURE 10 is a side view of the rubber working tool illustrated in FIGURE 9;

FIGURE 11 is an end view of still another form of the rubber working tool; and,

FIGURE 12 is a side view of the rubber working tool illustrated in FIGURE 11.

Referring now particularly to FIGURES 1 through 5 of the drawing, the rubber stitcher 20 may include a support or stand 21 having an inverted channel shaped base 23 which is supported in raised position by the legs 25 and 26. The upper end of the legs 25 and 26 telescope into the tubular couplings 27 and 28, respectively, which diverge downwardly relative to one another on opposite sides of the base 23 and are rigidly secured thereto in any suitable manner, as by welding. The support plate 30 of the electric motor 31 is rotatably supported on the base 23 by means of a pivot bolt 32 which extends through suitable apertures in the support plate and in the web of the channel shaped base, and through a spacer sleeve 35 interposed between the support plate and the base. It will be apparent therefore that a motor may be rotated or pivoted about a vertical axis.

The legs 25 are provided with T-shaped feet 38 and 39 which have tubular support portions 40 and 41 in which are telescoped the ends of the legs 25 and 26. The transversely extending horizontal members 42 and 43 of the feet 38 and 39, respectively, provide transverse stability to the stand 21.

A tire holding mandrel 40 is rigidly secured to the couplings 27 and 28 in any suitable manner, as by means of the horizontal tubular members 44 and 45 which are rigidly secured to the couplings 27 and 28 by any suitable means such as welding and which extend laterally outwardly therefrom. The tubular members 44 and 45 extend to the inner mandrel 40 and may be secured to the mandrel in any suitable manner, as by welding, so that the mandrel 40 is rigidly secured to the stand.

The drive shaft 50 of the electric motor is provided with a flexible drive shaft 51 having the usual protective sheath 52. The flexible drive shaft is connected to the drive shaft of the motor by any suitable conventional fitting 54. The flexible shaft and its sheath extend through a tubular support 55 on the outer end of an arm 56 whose inner end is rigidly secured, as by welding, to the support plate 30 of the motor. The tubular support of course holds the portion of the flexible shaft adjacent the motor shaft alignment therewith. A stitcher head assembly 57 has a drive shaft 58 whose outer end is secured to the flexible shaft 51 by the usual fitting or coupling 59 which telescopes over the end of the stitcher head assembly drive shaft 58 which projects outwardly of the housing 60 of the stitcher head. The coupling of course may be secured to the drive shaft by suitable means, or by set screws.

The housing 60 is substantially tubular in form and is provided with a longitudinal bore 62 through which the drive shaft 58 extends. The bore 62 is enlarged at its opposite ends to provide oppositely facing annular recesses 65 and 66 in which are receivable the bearing assemblies 67 and 68, respectively. The bearing assembly 67 has an outer race 70 and an inner race 71 between which are disposed the ball bearings 72. Inward movement of the bearing assembly is limted by the engagement of the outer race 70 with the annular shoulder 74 defining the inner end of the recess 65. The bearing assembly 68 similarly includes an outer race 77 and an inner race 78 between which are disposed the ball bearing 79. Inward movement of the ball bearing assembly 68 into the bore 62 of the housing 60 by the engagement of the outer race with the annular shoulder 80 defining the inner end of the recess 66. Outward movement of the shaft relative to the housing 60 is limited by the engagement of the annular shoulder 83 thereof provided by the enlargement 84 of the shaft with the inner race 78 while inward movement of the shaft relative to the housing is limited by the engagement of a split retainer ring 85 with the inner race 71 of the bearing assembly 67. The split retainer ring 85 is receivable in a suitable annular recess 86 of the shaft.

The housing 60 has a head 90 rigidly secured thereto in any suitable manner as by means of the screws 91 which extend through suitable apertures 92 of the housing head and through the aligned threaded bores 93 of the housing 60. The housing head has a flat section 93a having the apertures 92 and a rectangular tubular section 94 which may be secured to the plate section, in any suitable manner, as by welding.

The tubular section 94 of the housing head 90 is provided with a pair of aligned shaft bores 97 and 98 in its upper and lower ends. The shaft bores are provided with sleeve bearings 99 and 100, respectively. A vibrator impact shaft 101 extends through the housing head and through the sleeve bearings 98 and 99. The open end of the housing head is closed by the cover plate 102 rigidly secured to the housing head in any suitable manner, as by means of the screws 103 which extend through suitable apertures of the cover plate into suitable threaded bores in the tubular section 94 of the housing head. The housing head thus provides a rectangular chamber or recess 104 through which the vibrator shaft extends.

A vibrator head block 110 is disposed in the recess or chamber 104 of the housing head and is rigidly secured to the vibrator shaft by means of the pins 112 which extend through suitable aligned apertures in the head block and in the vibrator shaft, the vibrator shaft extending through the bore 113 of the head block. The head block has a transversely enlarged portion 114 provided with a rectangular slot or recess 115 which provides the spaced parallel surfaces 116 and 117 which are engageable by the outer surfaces of the outer race 120 of the bearing assembly 121. The bearing assembly also includes an inner race 123 and the ball bearings 124 which are disposed between the races. The inner race of the bearing assembly 121 receives, and may be rigid within, the eccentric or offset crank pin 126 projecting longitudinally outwardly and offset from the longitudinal central axis of the drive shaft 58. The head of the drive shaft within the recess 104 of the housing head 90 may have an enlarged portion, as at 130, in order that the crank pin thereof may be offset a desired distance from the central longitudinal central axis of the shaft.

It will be apparent that as the drive shaft 58 of the stitching head assembly rotates, the ball bearing assembly will be able to rotate and the crank pin will move in directions both parallel and perpendicular to the longitudinal axis of the vibrator shaft 101. No movement or force will be imparted to the vibrator head block 110 by the crank pin 126 in directions perpendicular to the longitudinal axis of the vibrator shaft since the bearing assembly 121 is free to move in directions perpendicular to the longitudinal axis of the shaft 100 within the recess 115 of the head block. Movement of the crank pin in directions parallel to the longitudinal axis of the vibrator shaft, however, causes movement of the head block in such longitudinal directions due to the engagement of the outer race with the surfaces 116 and 117 of the head block. It will thus be apparent that as the drive shaft 58 is rotated, vibratory or reciprocatory longitudinal movement is imparted to the vibrator shaft 101. The amplitude of such movement of the vibrator shaft is determined by the eccentricity of the crank pin 126 relative to central longitudinal axis of the drive shaft and its frequency depends on the speed of rotation of the drive shaft.

The head block 110 is guided in its longitudinal movement within the rectangular chamber 104 of the housing 10 by the engagement of the sides 131 and 132 of the enlarged portion 114 of the head block with the flat parallel inner surfaces 133 and 134, respectively, provided by the sides of a tubular section of the housing. The outer end of the vibrator shaft has a snap-on head 135 rigidly secured thereto in any suitable manner. The snap-on head has the usual rectangular lug 136 which is receivable in the rectangular recess 137 of the snap-on socket 138 of a rubber working tool or blade 140. The lug 136 of the snap-on head 135 is of course provided with the usual detents 142 which are biased outwardly by a spring 143 disposed in a suitable bore of the lug. The inner surfaces of the snap-on sockets are provided with recesses for receiving the detents when the lug of the snap-on head is properly positioned within the recess of the socket.

A stabilizing pin or rest 145 is secured to the tubular housing by means of a reduced threaded portion 146 thereof which extends into a suitable threaded bore of the tubular housing 60. The stabilizing pin or rest 145 extends outwardly from the housing in the same direction as the vibrator shaft 101 and is adjacent the end of the housing remote from the vibrator shaft so that the stabilizing pin may be placed on the tire carcass to help support the stitching head assembly while the rubber working tool 140 is in engagement with the gum rubber which is to be compacted by impacts delivered thereto by the working tool.

The rubber working tool 140 may have an elongate narrow blade 148 as is illustrated in FIGURES 2 and 6. The working tool may be of other configurations and dimensions for use in compacting, or imparting impacts, to gum rubber disposed in different shaped cavities, indentations or recesses of the tire carcass. For example, the tire working tool 150, which is provided with a socket 151 of the same dimensions and structure as the socket 138, may be provided with a relatively long round shaft 152 whose free end remote from the socket 151 has flat sides 153 which converge inwardly to an edge. The rubber working tool 160 is similarly provided with a socket head 161 which is identical to the socket 138 and is provided with a short round shaft having flat sides which converge inwardly to an edge. The working tool 170 has a socket head 171 from which extends a narrow flat blade 172.

In use, when it is desired to place new gum rubber in depressions, recesses or indentations present in the rubber coated fabric carcass of a tire because of cuts, punctures or blow-outs or because the cord of the tire carcass has been replaced and it is necessary to build up the carcass body with a plug of solid gummed rubber before the recapping strip is applied to the carcass, the new gum rubber is placed in such depressions, recesses or indentations of the carcass.

The tire carcass is slipped over the mandrel and onto the tubular members 44 and 45 and is held thereon by the mandrel which abuts a side wall of the tire carcass. The tire carcass, of course, may be rotated or moved on the tubular members as required to position the tire in proper position for compacting by the rubber stitcher. A working tool having the desired dimensions and configuration is then snapped on the outer end of the vibrator shaft. The edge of the selected rubber working tool is then placed in contact with the new gum rubber and the prime mover is energized. The electric motor rotates at a speed in excess of 3,000 r.p.m. so that the reciprocating impacts delivered to the soft gum rubber being worked are at a rate in excess of 3,000 strokes per minute. Due to this high frequency of impacts delivered to the gum rubber by the tool, any air trapped between the gum rubber and the tire carcass or within the gum rubber itself is expelled so that the applied gum rubber is solid and has no cavities, air pockets or voids and the tire repair is effected in the most efficient manner. At the same time the high frequency impacts delivered to the gum rubber cause it to adhere to the tire carcass.

During such stitching or impact delivering operations, the stabilizing pin or rest 145 helps support the stitching head assembly. The stitching head assembly may be swung about the stabilizing pin 145 since it is remote from the vibrator shaft 101 so that the rubber working tool may be across the whole area of the gum rubber by a relatively easy and non-fatiguing movement of the stitching head assembly.

The pivotal or rotatable mounting of the motor and the connection of the drive shaft thereof to the drive shaft assembly by a flexible shaft facilitates manipulation of the stitching head assembly as required to position the edge of the tire working tool on the vibrator shaft in proper contact with the gum rubber being compacted or worked thereby.

The various working tools may be changed as required to properly work the gum rubber. For example, working tools having wider edges, such as the working tool 140 with the long blade 148, may be used to force gum rubber into deep holes and working tools having successively shorter working edges may be used to further compact the strip of gum rubber as it is folded and pressed into place in the depression or recess of a tire carcass as the plug of gum rubber is built up therein to a position slightly above the surface of the carcass of the tire.

It will now be seen that the new and improved rubber stitcher of the invention includes a support having a mandrel on which a tire carcass which is to be repaired may be mounted and that a prime mover, such as an electric motor, mounted on the support for movement about the vertical axis.

It will also be seen that the drive shaft of the motor is connected to the drive shaft of a stitching head assembly by a flexible shaft, so that the stitching head assembly may be easily manipulated and its rubber working blade moved as desired over the surface of the tire carcass to compact and work the gum rubber which is applied to the tire carcass to fill depressions, recesses or indentations of the tire carcass.

It will further be seen that the stitching head assembly includes a rotatable drive shaft and a vibrator shaft mounted in the housing for vibratory longitudinal movement in the direction perpendicular to the longitudinal axis of the rotary shaft.

It will further be seen that the rotary drive shaft is connected to the vibrator shaft by means of an eccentric pin on the rotary shaft, a drive block rigidly secured to the vibratory shaft and a bearing means interposed between the vibrator shaft and the vibrator head and in engagement therewith for imparting vibratory longitudinal movement to the vibratory shaft as the drive shaft is rotated.

It will further be seen that the connecting means includes a recess in the vibrator block which provides parallel spaced surfaces engageable by such bearing means so that the bearing means is free to move relative to the vibrator in a direction perpendicular to the direction of longitudinal vibratory movement of the vibratory shaft but cannot move relative to the vibrator block in directions parallel to the direction of such vibratory movement of the vibrator shaft.

It will further be seen that the vibrator block is disposed within a housing head rigid with the housing which provides parallel guide surfaces engageable by the sides of the vibrator block for guiding the vibratory reciprocal movement of the guide block and therefore of the vibrator shaft.

It will further be seen that the vibrator shaft and the working tools are provided with easy connect and disconnect means whereby rubber working tools of different configurations and sizes may be easily connected to and disconnected from the vibrator shaft.

It will further be seen that the housing of the stitching head assembly is provided with a stabilizing pin or rest remote from the vibrator shaft so that the assembly may be swung about the stabilizing pin as it rests on a tire carcass to move the edge of the tire rubber working tool over a desired surface area of the carcass without causing undue fatigue or exertion on the part of the operator.

While the drive shaft 58 of the stitching head assembly has been illustrated and described as being rotated by a flexible shaft 51 driven by an electric motor 31, it will be apparent that the stitching head assembly may be rotated by other means. For example, the housing head could be secured to the housing of a compressed air motor whose drive shaft would be provided with the eccentric crank pin 126 which would project inwardly into the inner race 123 of the bearing assembly 121 disposed in the recess 115 of the vibrator block 110. The compressed air motor would be supplied with compressed air from any suitable source by means of a flexible conduit or hose so that the compressed air motor and the stitching head assembly could be easily manipulated as required during the use thereof on a tire carcass.

It will be also apparent that the spacer sleeve 35 interposed between the support plate 30 and the base 23 may be of such length that the arm 56 will easily clear or pass over a tire carcass supported on the tubular members 44 and 45 in the event the arm 56 is of such length that it will extend outwardly past the upper ends of the tubular members 44 and 45 and the tire carcass as the motor is rotated so that rotation of the motor through 360 degrees may take place.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A rubber stitcher including: a support; means carried by said support for holding a tire carcass; a prime mover carried by said support for movement about a vertical axis, said prime mover having a rotatable drive shaft; a stitching head assembly having longitudinally reciprocable vibrator shaft, a rotary drive shaft and means operatively associated with said vibrator shaft and said rotary drive shaft for causing rotation of said rotary drive shaft to result in reciprocal vibratory movement of said vibrator shaft; and flexible shaft means connecting the drive shaft of said prime mover with the drive shaft of said stitching head assembly, said vibrator shaft having a working tool secured thereto for engaging a tire carcass held by said holding means and imparting impacts to the tire carcass as said rotary drive shaft of said stiching head assembly rotates and imparts vibratory movement to said vibrator shaft.

2. A rubber stitcher including: a support; means carried by said support for holding a tire carcass; a prime mover carried by said support for movement about a vertical axis, said prime mover having a rotatable drive shaft; a stitching head assembly having longitudinally reciprocable vibrator shaft, a rotary drive shaft and means operatively associated with said vibrator shaft and said rotary drive shaft for causing rotation of said rotary drive shaft to result in reciprocal vibratory movement of said vibrator shaft; and flexible shaft means connecting the drive shaft of said prime mover with the drive shaft of said stitching head assembly, said vibrator shaft having a working tool secured thereto for engaging a tire carcass held by said holding means and imparting impacts to the tire carcass as said rotary drive shaft of said stitching head assembly rotates and imparts vibratory movement to said vibrator shaft; and means carried by said support for supporting a portion of said flexible shaft means adjacent said drive shaft of said prime mover in alignment with said drive shaft of said prime mover.

3. A rubber stitcher including: a support; means carried by said support for holding a tire carcass; a prime mover carried by said support for movement about a vertical axis, said prime mover having a rotatable drive shaft; a stitching head assembly having longitudinally reciprocable vibrator shaft, a rotary drive shaft and means operatively associated with said vibratory shaft and said rotary drive shaft for causing roation of said rotary drive shaft to result in reciprocal vibratory movement of said vibrator shaft; and flexible shaft means connecting the drive shaft of said prime mover with the drive shaft of said stitching head assembly, said vibrator shaft having a working tool secured thereto for engaging a tire carcass held by said holding means and imparting impacts to the tire carcass as said rotary drive shaft of said stitching head assembly rotates and imparts vibratory movement to said vibrator shaft, said stitching head assembly having projecting means engageable with a tire carcass held by said holding means at a point spaced from said working tool whereby said stitching head assembly is movable about said projecting means.

4. A rubber stitcher including: a support; means carried by said support for holding a tire carcass; a prime mover carried by said support for movement about a vertical axis, said prime mover having a rotatable drive shaft; a stitching head assembly having longitudinally reciprocable vibrator shaft, a rotary drive shaft and means operatively associated with said vibrator shaft and said rotary drive shaft for causing rotation of said rotary drive shaft to result in reciprocal vibratory movement of said vibrator shaft; and flexible shaft means connecting the drive shaft of said prime mover with the drive shaft of said stitching head assembly, said vibrator shaft having a working tool secured thereto for engaging a tire carcass held by said holding means, said stitching head assembly having projecting means engageable with a tire carcass held by said holding means at a point spaced from said working tool whereby said stitching head assembly is movable about said projecting means; and means carried by said support for supporting a portion of said flexible shaft means adjacent said drive shaft of said prime mover in alignment with said drive shaft of said prime mover.

5. A stitching head assembly including: a housing; a drive shaft mounted in said housing for rotation about its longitudinal axis; a vibrator shaft mounted in said housing for longitudinal reciprocal vibratory movement in a direction perpendicular to said longitudinal axis; and means in said housing connecting said shafts for causing rotation of said drive shaft to impart reciprocal vibratory movement to said vibrator shaft, said vibrator shaft having an end portion extending outwardly of said housing whereby a working tool is securable thereto for engaging a tire carcass and imparting impacts to the tire carcass as said drive shaft rotates and imparts reciprocal vibratory movement to said vibrator shaft, said connecting means including a block rigidly secured to said vibrator shaft and having a pair of spaced surfaces extending perpendicularly relative to said direction and to said axis, means on said drive shaft extending parallel to but spaced from said axis and between said surfaces, and friction reducing means interposed between said surfaces and said means on said drive shaft and engageable with said surfaces and said means on said drive shaft.

6. A stitching head assembly including: a housing; a drive shaft mounted in said housing for rotation about its longitudinal axis; a vibrator shaft mounted in said housing for longitudinal reciprocal vibratory movement in a direction perpendicular to said longitudinal axis; and means in said housing connecting said shafts for causing rotation of said drive shaft to impart reciprocal vibratory movement to said vibrator shaft, said vibrator shaft having a portion extending outwardly of said housing whereby a working tool may be secured to said vibrator shaft for engaging a tire carcass and imparting impacts to the tire carcass as said drive shaft rotates and imparts vibratory movement to said vibrator shaft, said connecting means including a block rigidly secured to said vibrator shaft and having a pair of spaced surfaces extending perpendicularly relative to said direction and to said axis, said block and said housing having coengageable means for guiding movement of said block in said housing.

7. A stitching head assembly including: a housing; a drive shaft mounted in said housing for rotation about its longitudinal axis; a vibrator shaft mounted in said housing for longitudinal reciprocal vibratory movement in a direction perpendicular to said longitudinal axis; and means in said housing connecting said shafts for causing rotation of said drive shaft to impart reciprocal vibratory movement to said vibrator shaft, said vibrator shaft having an end portion extending outwardly of said housing; and means on said end portion for detachably securing working tools to said vibrator shaft whereby the working tools may engage a tire carcass and impart impacts thereto as said drive shaft rotates and imparts reciprocal vibratory movement to said vibrator shaft.

8. A stitching head assembly including: a housing having a drive shaft bore and a recess communicating with one end of said bore; a drive shaft mounted in said bore for rotation about its longitudinal axis and having drive means extending into said recess, said drive means extending parallel to and spaced from said longitudinal axis; a vibratory shaft mounted on said housing and extending through said recess for longitudinal vibratory movement in directions perpendicular to said longitudinal axis; a block disposed in said recess and rigidly secured to said vibrator shaft; said block having opposing parallel surfaces disposed in planes lying perpendicular relative to said longitudinal axis and said directions; and friction reducing means disposed between and engageable with said surfaces and said drive means.

9. A stitching head assembly including: a housing having a drive shaft bore and a recess communicating with one end of said bore; a drive shaft mounted in said bore for rotation about its longitudinal axis and having drive means extending into said recess, said drive means extending parallel to and spaced from said longitudinal axis; a vibratory shaft mounted on said housing and extending through said recess for longitudinal vibratory movement in directions perpendicular to said longitudinal axis; a block disposed in said recess and rigidly secured to said vibrator shaft; said block having opposing parallel surfaces disposed in planes lying perpendicular relative to said longitudinal axis and said directions; and friction reducing means disposed between and engageable with said surfaces and said drive means, said friction reducing means comprising a bearing assembly including an inner race disposed about said drive means and an outer race disposed between said surfaces.

References Cited in the file of this patent

UNITED STATES PATENTS

| | | |
|---|---|---|
| 2,581,933 | Stevens | Jan. 8, 1952 |
| 2,600,291 | Engler | June 10, 1952 |
| 2,703,131 | Robbins et al. | Mar. 1, 1955 |
| 2,717,022 | Duerksen | Sept. 6, 1955 |
| 2,775,128 | Young | Dec. 25, 1956 |
| 2,936,632 | Palmer | May 17, 1960 |
| 3,047,048 | Appleby | July 31, 1962 |
| 3,051,220 | Ewing et al. | Aug. 28, 1962 |
| 3,056,448 | Dearing | Oct. 2, 1962 |
| 3,097,984 | Godfrey | July 16, 1963 |

OTHER REFERENCES

I.B.M. Technical Disclosure Bulletin, Tandem Scotch Yoke Assembly, by Noell et al., vol. 2, No. 5, February 1960.

UNITED STATES PATENT OFFICE
CERTIFICATE OF CORRECTION

Patent No. 3,152,942                                October 13, 1964

John R. Horton et al.

It is hereby certified that error appears in the above numbered patent requiring correction and that the said Letters Patent should read as corrected below.

Column 2, line 71, for "limted" read -- limited --; column 5, line 12, after "be" insert -- moved --; column 7, line 11, for "roation" read -- rotation --.

Signed and sealed this 20th day of April 1965.

(SEAL)
Attest:

ERNEST W. SWIDER
Attesting Officer

EDWARD J. BRENNER
Commissioner of Patents